Figure 1:
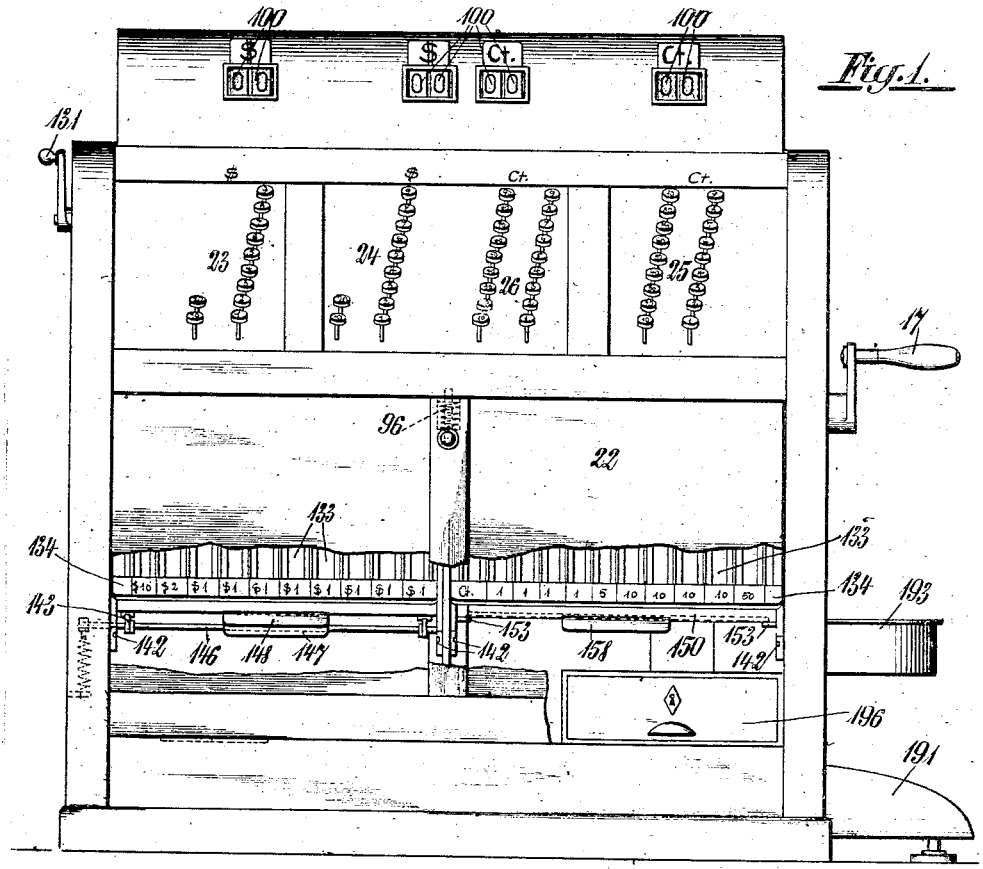

K. MAIER.
CASH REGISTER AND MONEY CHANGER.
APPLICATION FILED SEPT. 26, 1911.

1,128,889.　　　　　　　　　　Patented Feb. 16, 1915.
18 SHEETS—SHEET 1.

Witnesses
Grace P. Brereton
Albert Popkins

Inventor
Karl Maier
By Sturtevant & Mason
Attorneys

K. MAIER.
CASH REGISTER AND MONEY CHANGER.
APPLICATION FILED SEPT. 26, 1911.
1,128,889.
Patented Feb. 16, 1915.
18 SHEETS—SHEET 2.
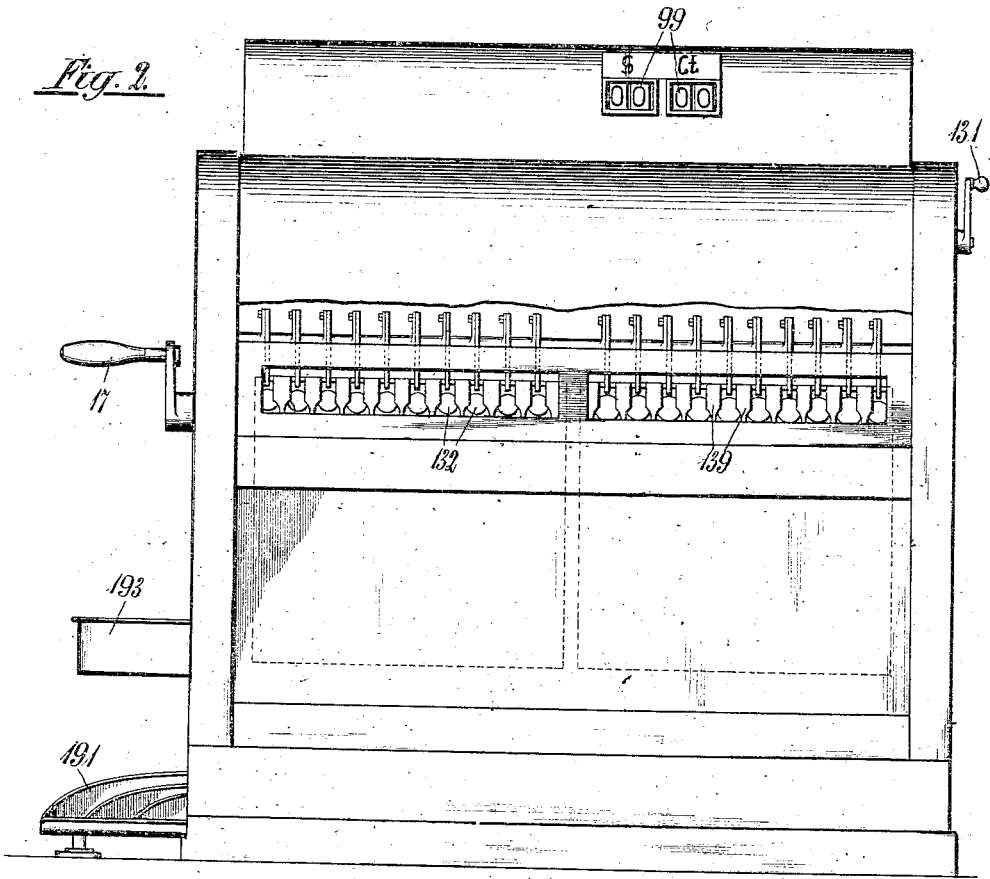
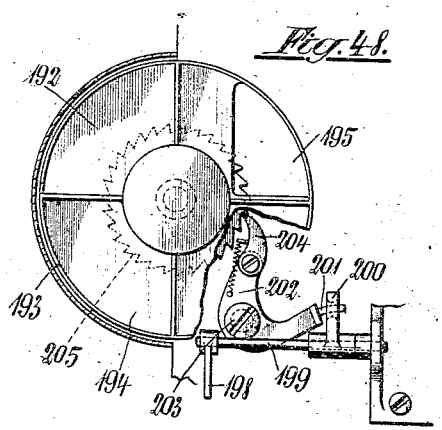
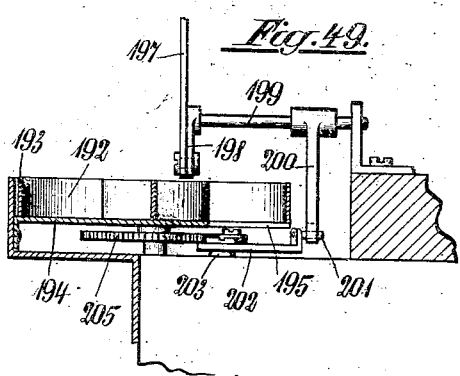

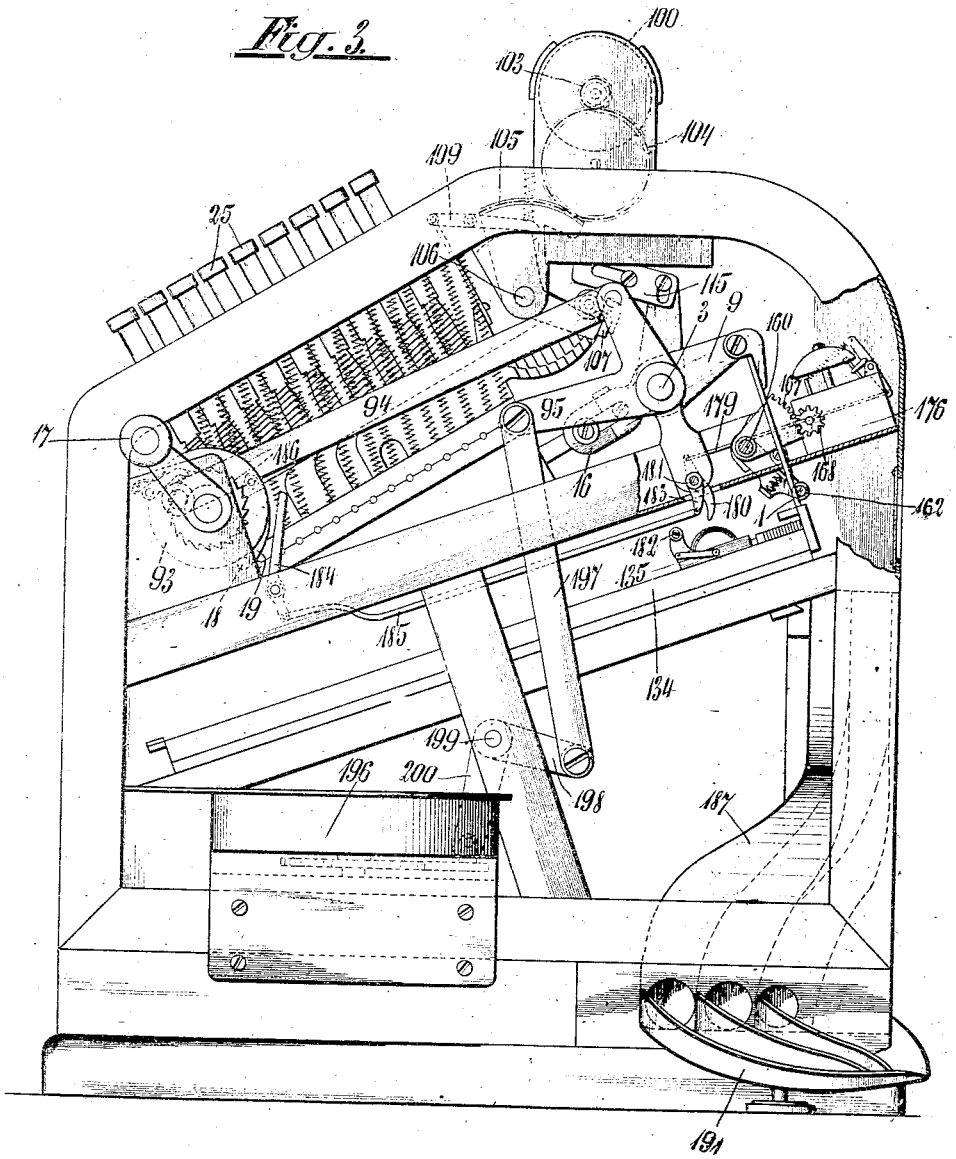

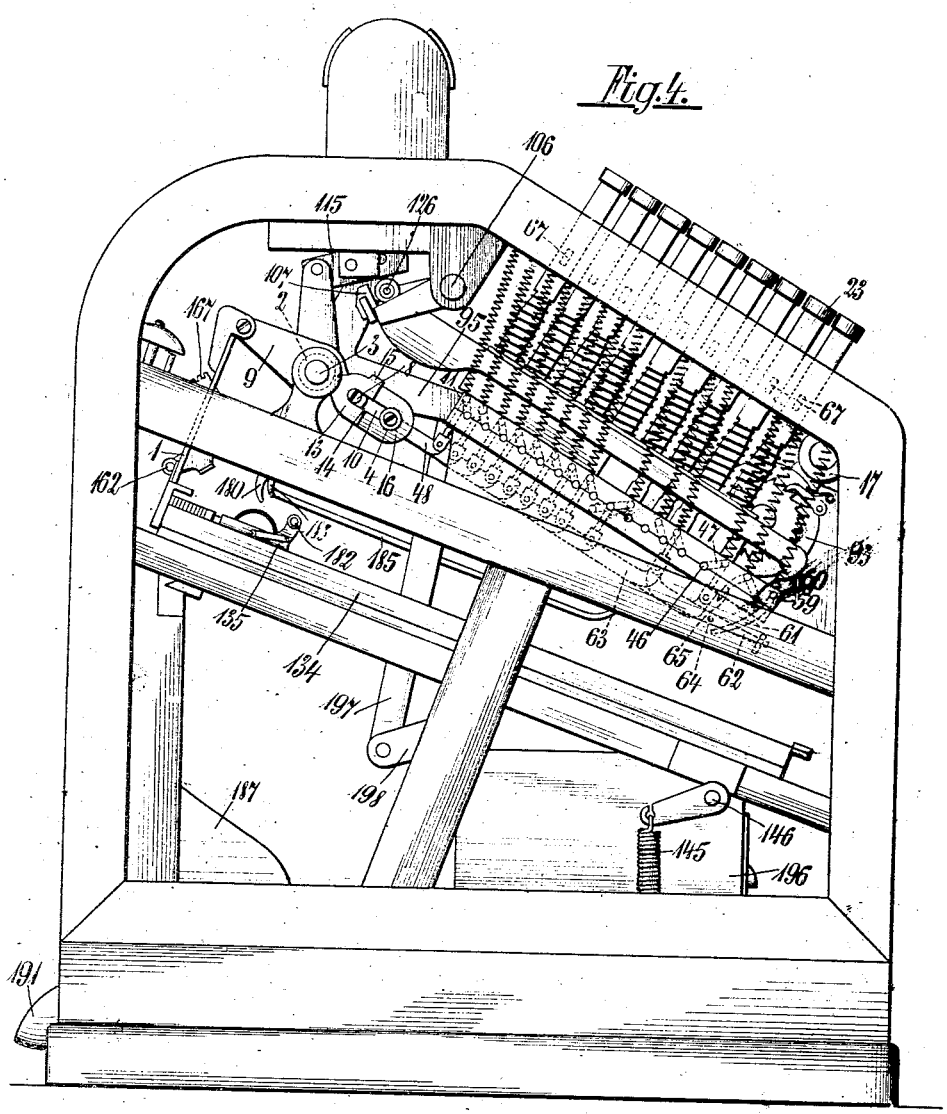

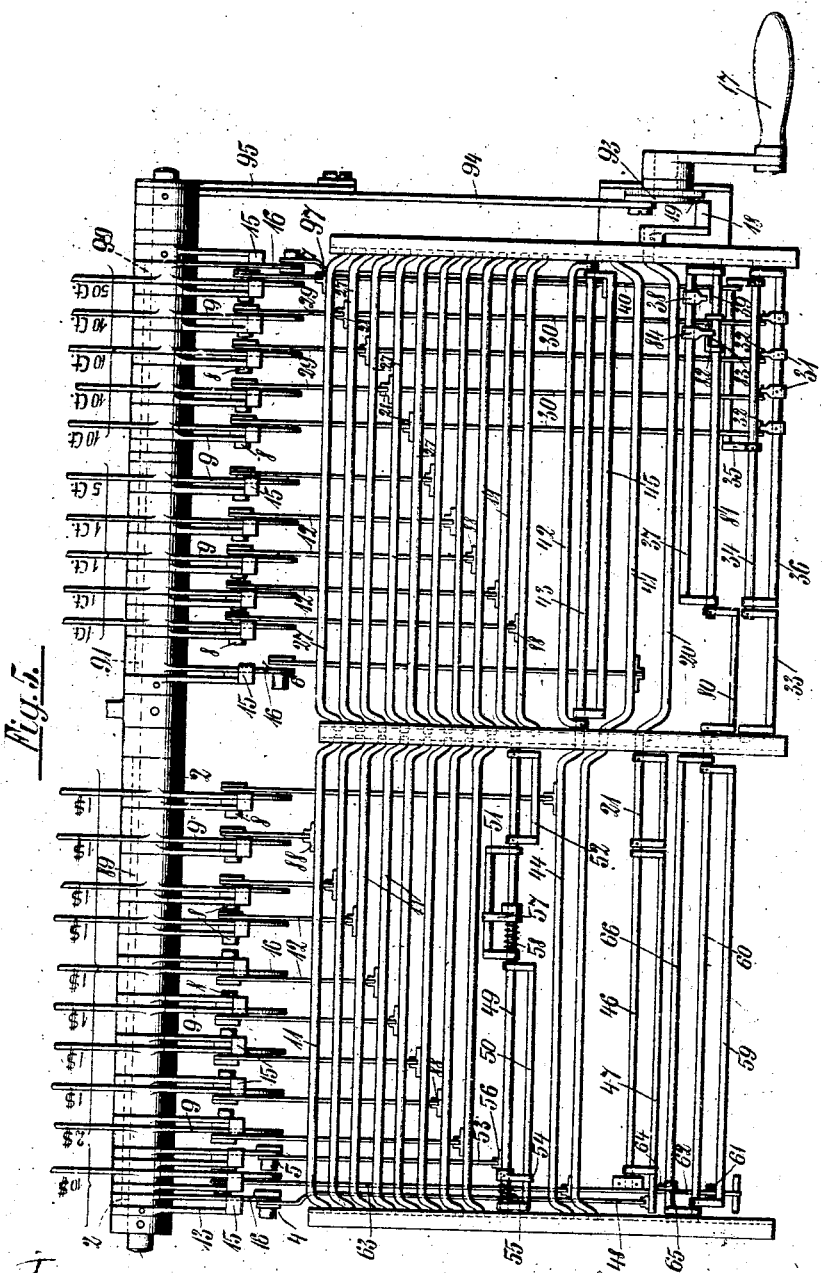

K. MAIER.
CASH REGISTER AND MONEY CHANGER.
APPLICATION FILED SEPT. 26, 1911.

1,128,889.

Patented Feb. 16, 1915.
18 SHEETS—SHEET 6.

K. MAIER.
CASH REGISTER AND MONEY CHANGER.
APPLICATION FILED SEPT. 26, 1911.
1,128,889.
Patented Feb. 16, 1915.
18 SHEETS—SHEET 7.
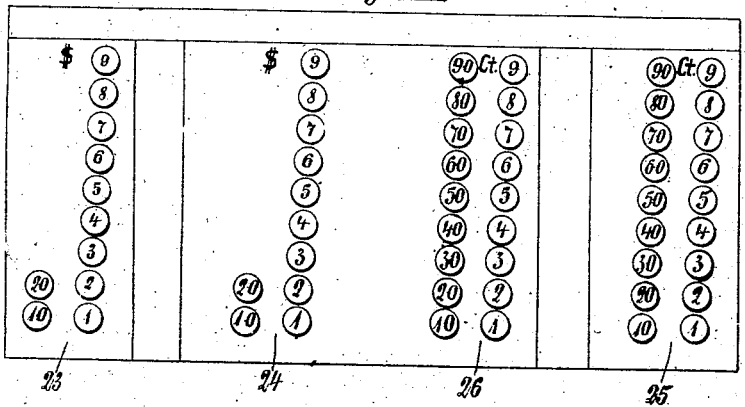
Fig. 7.
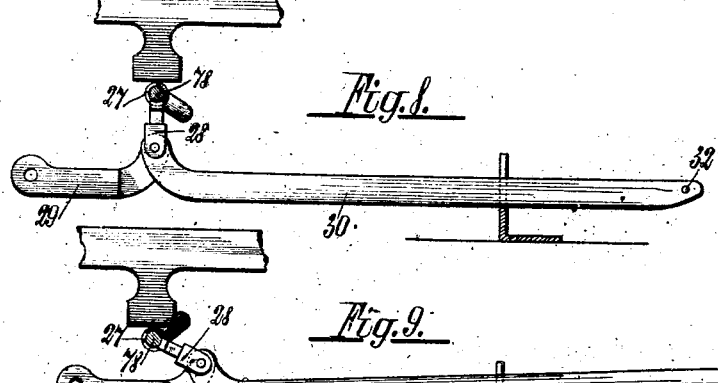
Fig. 8.
Fig. 9.
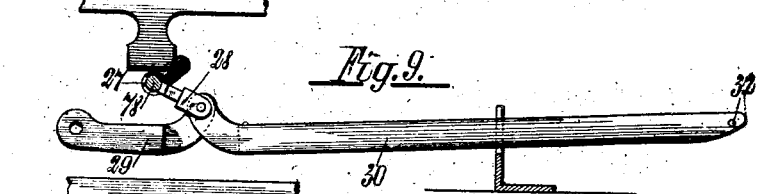
Fig. 10.
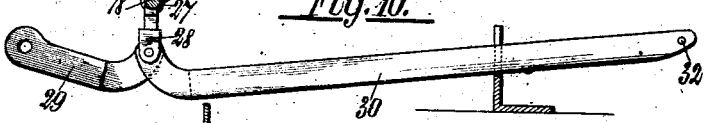
Fig. 11.

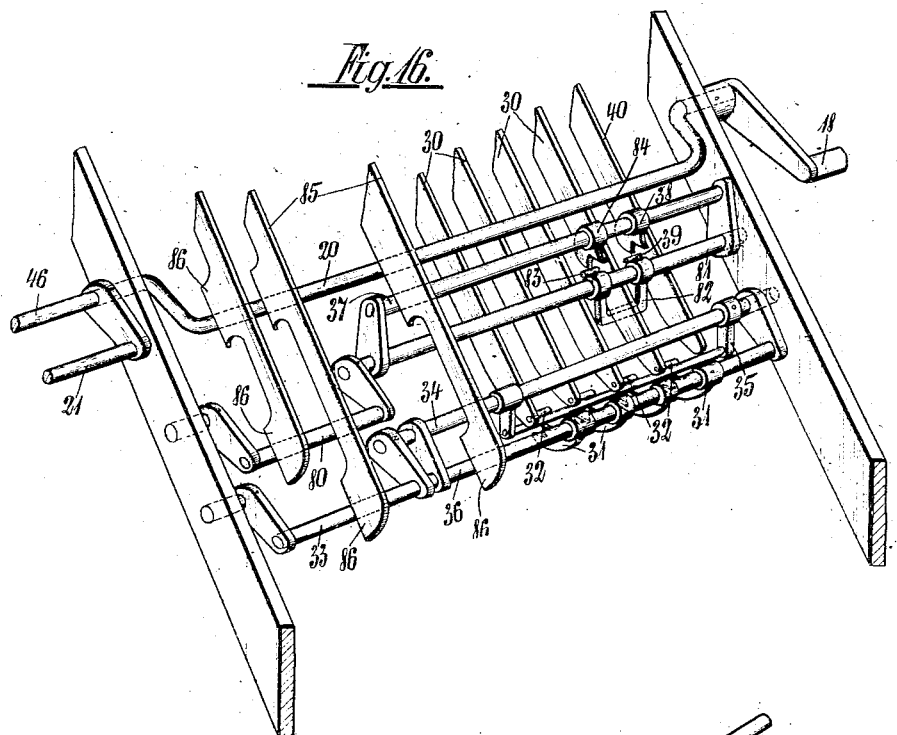

K. MAIER.
CASH REGISTER AND MONEY CHANGER.
APPLICATION FILED SEPT. 26, 1911.
1,128,889.
Patented Feb. 16, 1915.
18 SHEETS—SHEET 10.
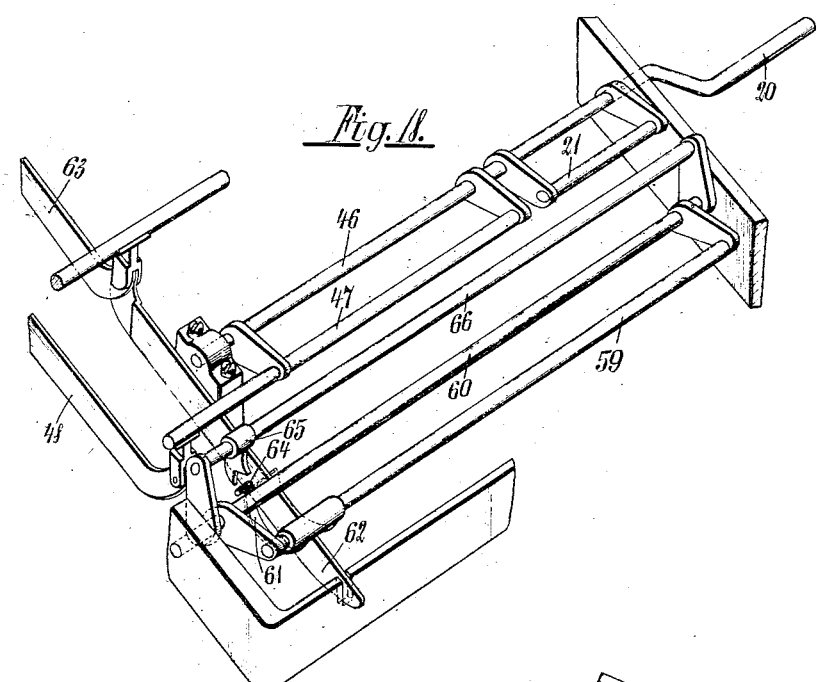
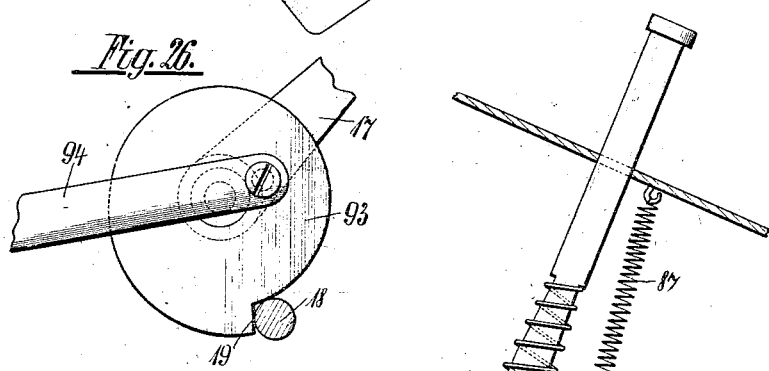
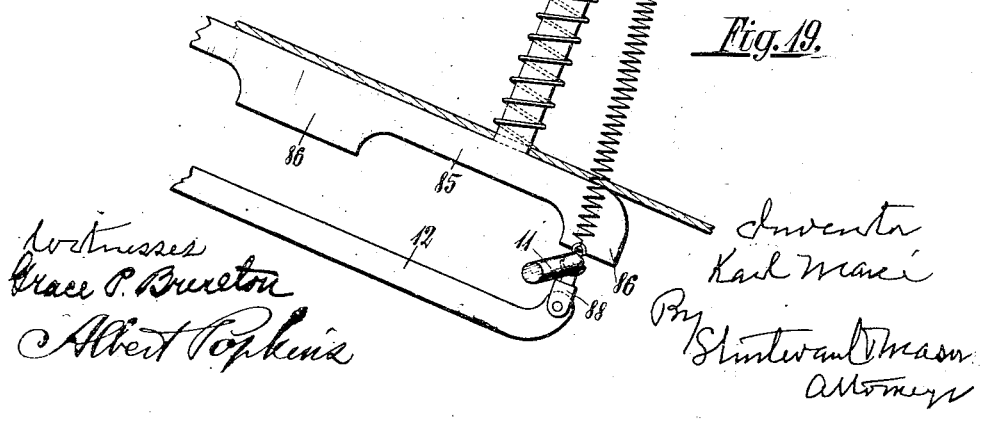

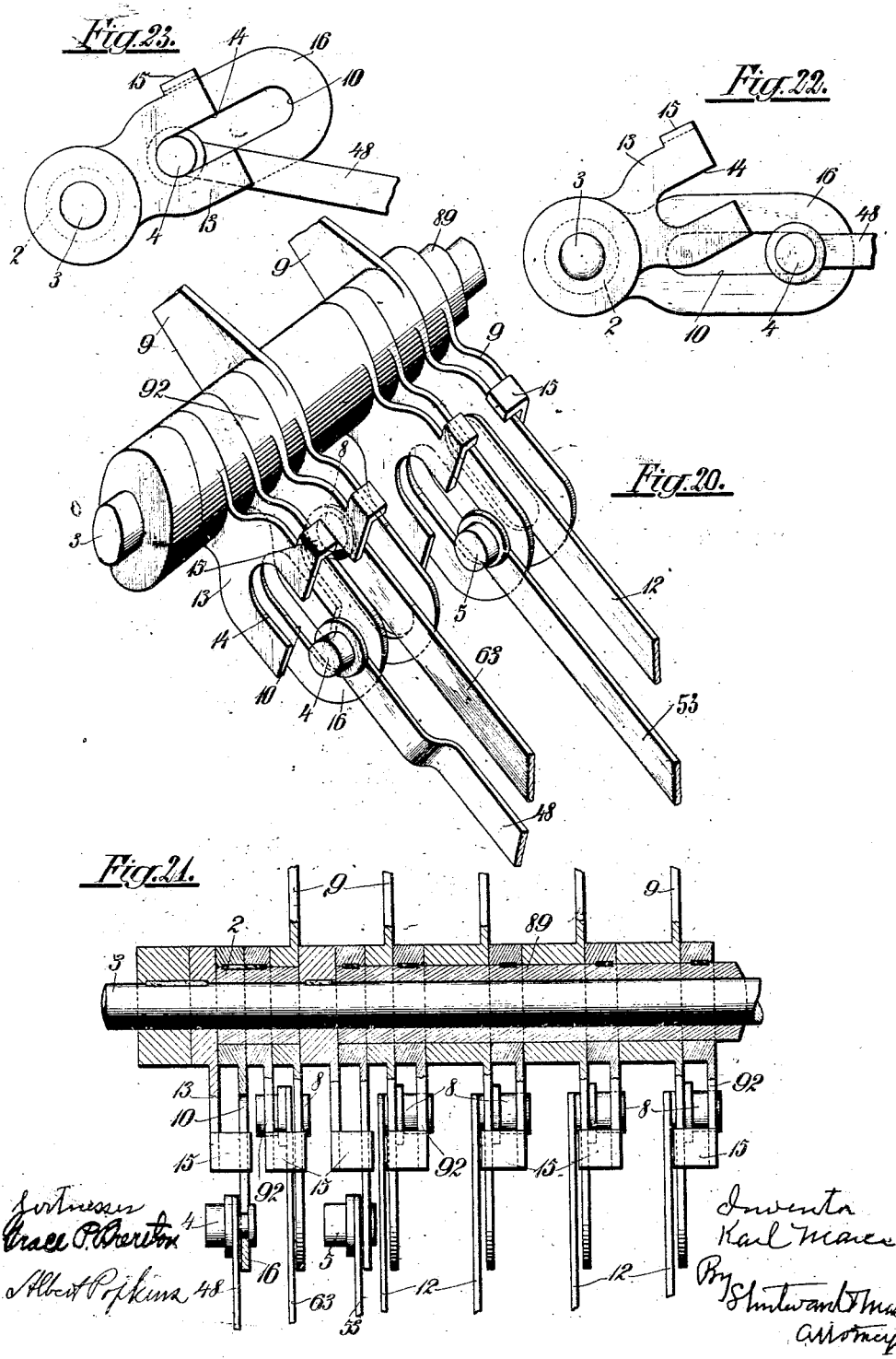

K. MAIER.
CASH REGISTER AND MONEY CHANGER.
APPLICATION FILED SEPT. 26, 1911.
1,128,889.
Patented Feb. 16, 1915.
18 SHEETS—SHEET 12.
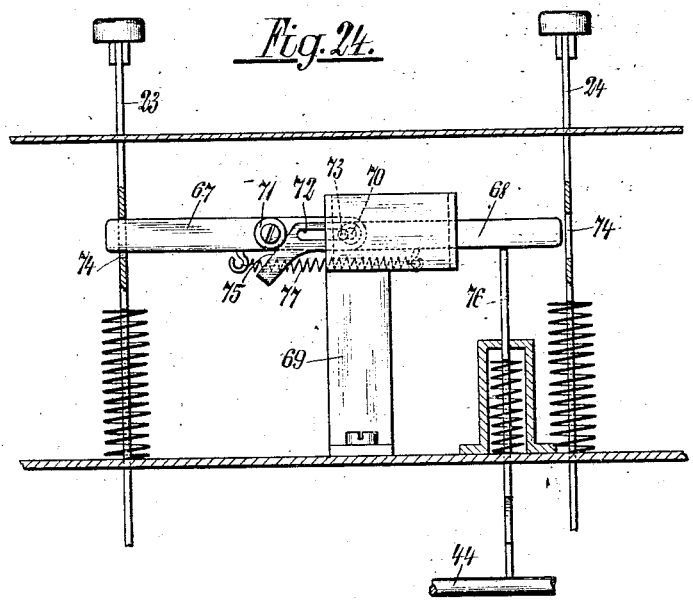
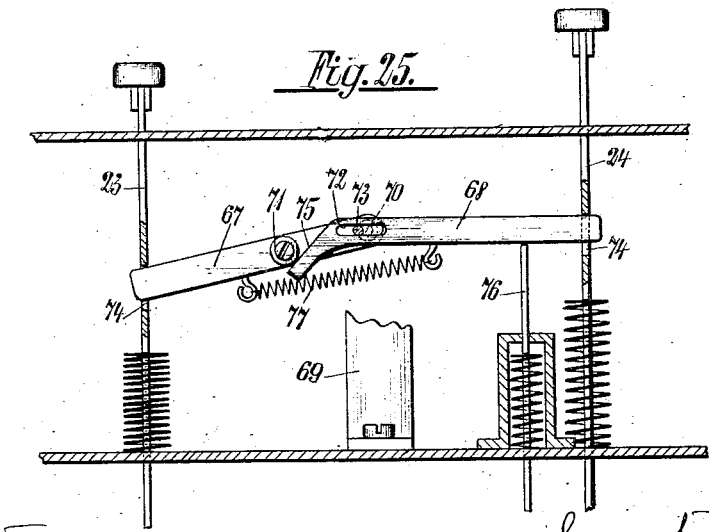

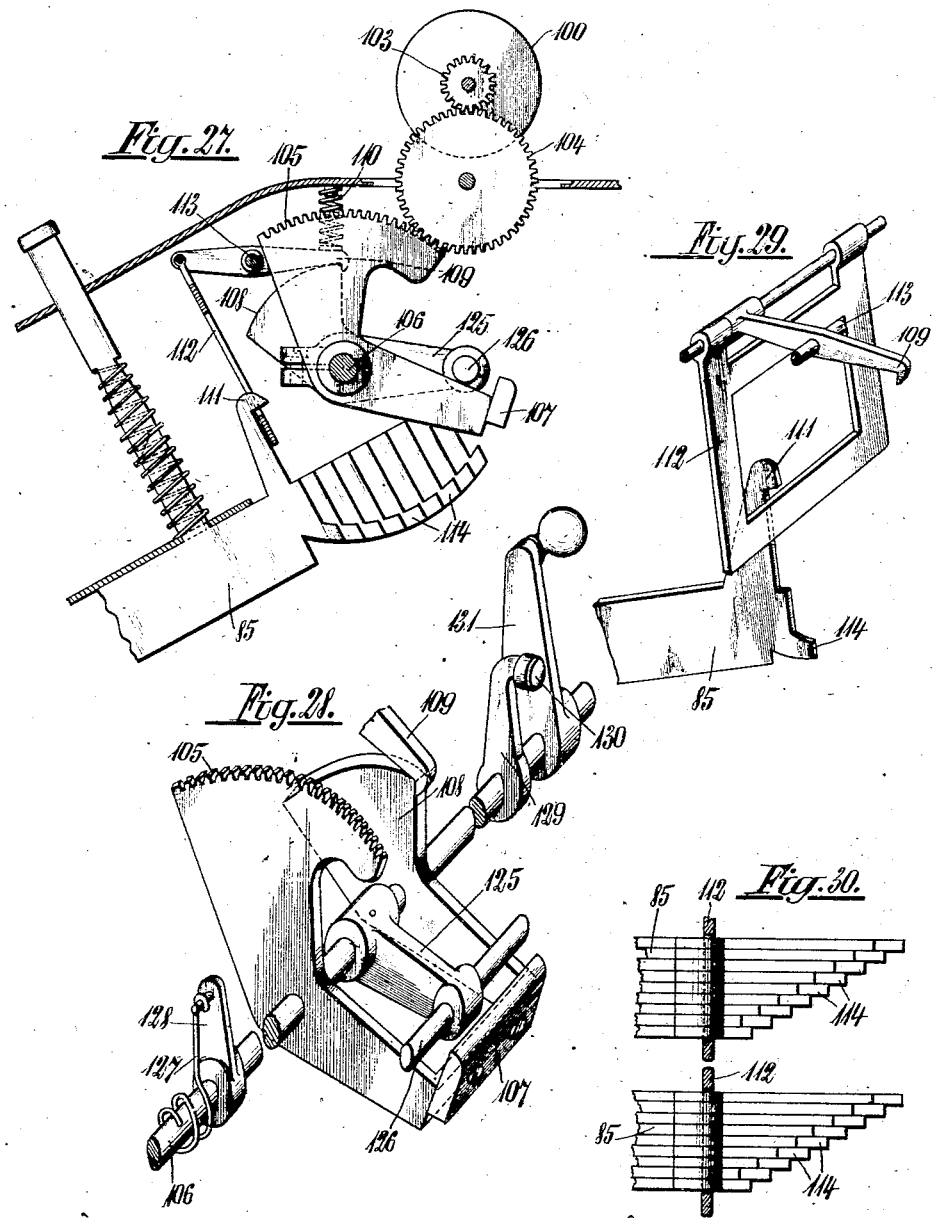

K. MAIER.
CASH REGISTER AND MONEY CHANGER.
APPLICATION FILED SEPT. 26, 1911.
1,128,889.
Patented Feb. 16, 1915.
18 SHEETS—SHEET 14.
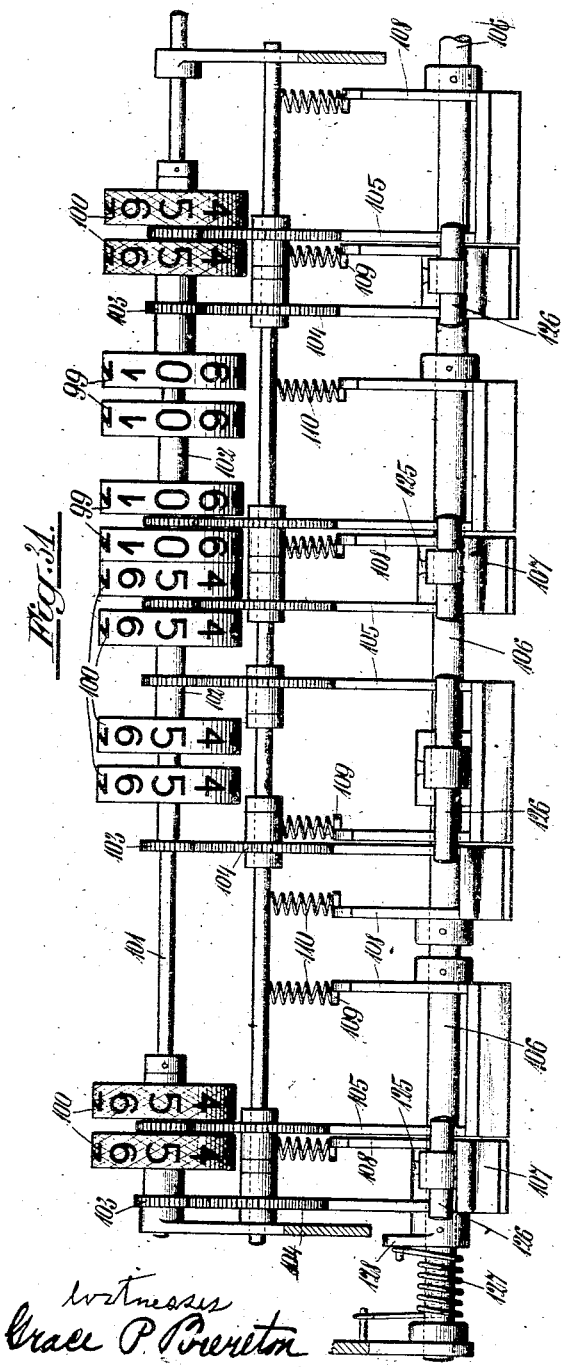
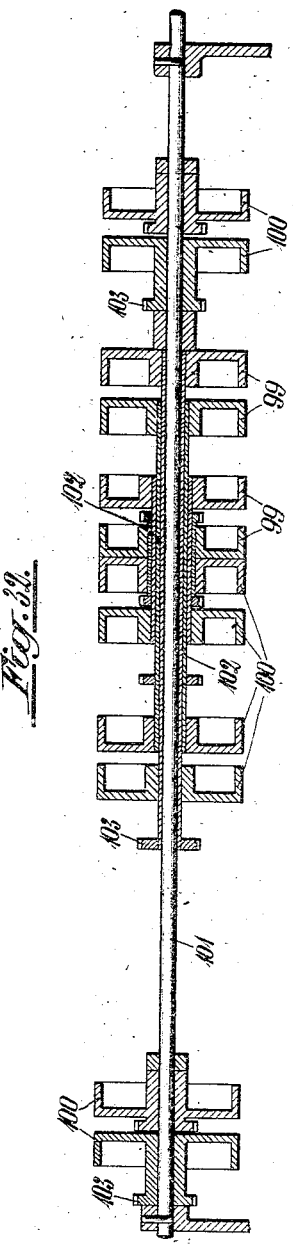

K. MAIER.
CASH REGISTER AND MONEY CHANGER.
APPLICATION FILED SEPT. 26, 1911.

1,128,889.

Patented Feb. 16, 1915.
18 SHEETS—SHEET 15.

K. MAIER.
CASH REGISTER AND MONEY CHANGER.
APPLICATION FILED SEPT. 26, 1911.

1,128,889.

Patented Feb. 16, 1915.
18 SHEETS—SHEET 16.

K. MAIER.
CASH REGISTER AND MONEY CHANGER.
APPLICATION FILED SEPT. 26, 1911.

1,128,889.

Patented Feb. 16, 1915.
18 SHEETS—SHEET 17.

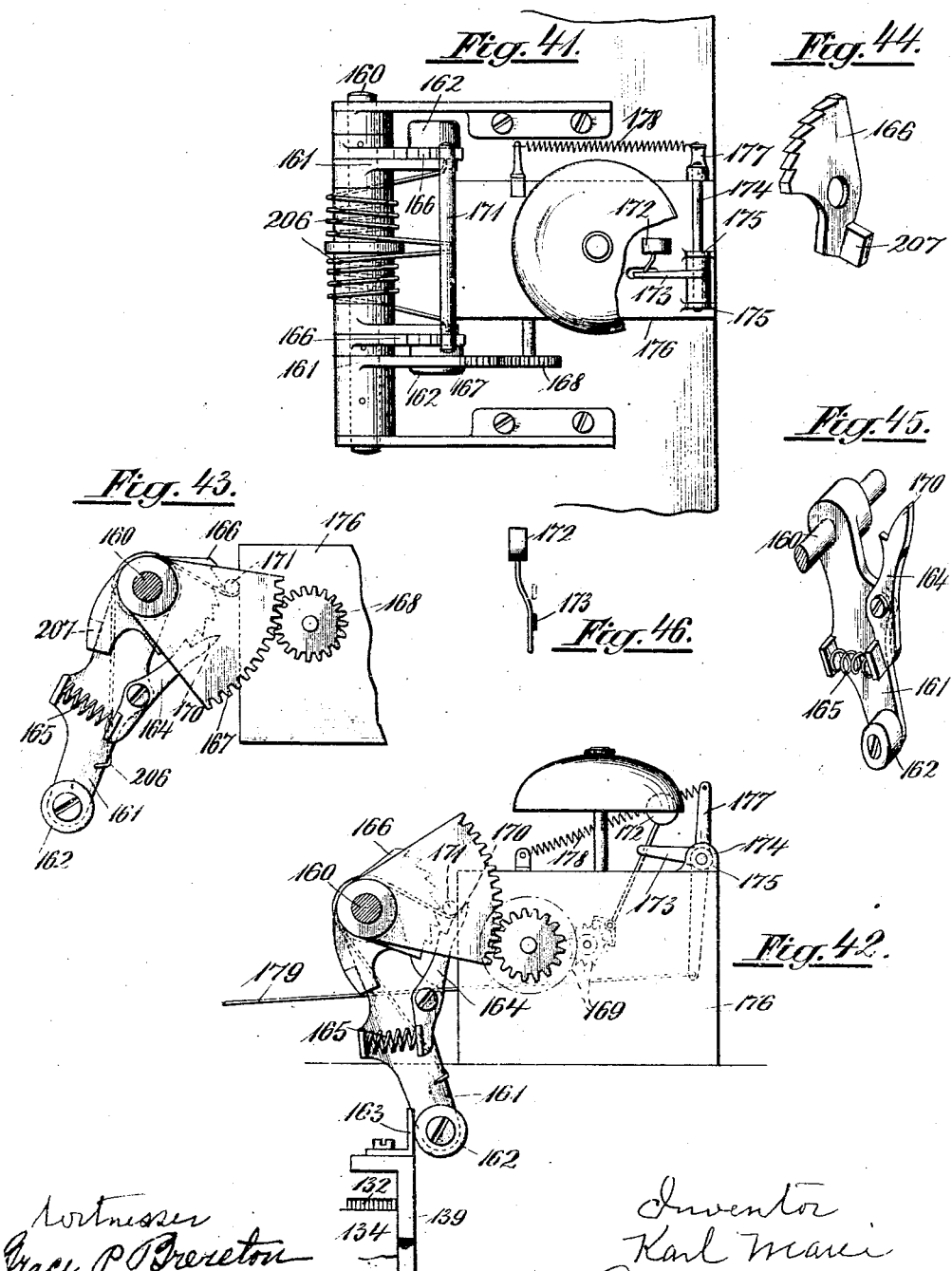

UNITED STATES PATENT OFFICE.

KARL MAIER, OF STUTTGART, GERMANY.

CASH-REGISTER AND MONEY-CHANGER.

1,128,889. Specification of Letters Patent. Patented Feb. 16, 1915.

Application filed September 26, 1911. Serial No. 651,457.

*To all whom it may concern:*

Be it known that I, KARL MAIER, a citizen of the German Empire, residing at Stuttgart, in the Kingdom of Wurttemberg, Germany, have invented certain new and useful Improvements in Cash-Registers and Money-Changers; and I do hereby declare the following to be a full, clear, and exact description of the invention, such as will enable others skilled in the art to which it appertains to make and use the same.

The object of the present invention relates to a novel kind of cash register and money-changer and the same distinguishes itself by practical usefulness and simplicity. In this machine, the usual key rail joints strike a system of single or double-armed loops, which operate the coupling or uncoupling of the coin ejectors through their driving device in common. In this connection, the loops are arranged in such manner that on depressing of the receipts and sales-keys the concerned ejector clutches are coupled and partly disconnected again, so that the still coupled coin-ejectors sum up the rest of the total amount. Hereby the deduction from an amount previously registered in the then following transition to a subordinate sort of coin, as from dollars to cents, or " tens " to " ones " is attended to automatically. Further, the ejectors are directly connected in groups upon sleeves, releasable by clutches, with the driving shaft, whereby only that group of ejectors works the sleeve of which has been coupled with the driving shaft, but the other groups remain inactive, if a sale has not been registered with them. Then the actuation of the clutches is subjected to the action of several keys, so that previous registrations coöperate when a subsequent key is depressed, whereby it is rendered possible to register with one key different amounts according to the registrations which have preceded. The coins are stacked in coin frames and are subjected to the action of springs, whereby they are advanced and when the frame is empty of a desired sort of coin, an alarm is rung and an arresting device stops the driving crank. On filling the frame with the wanted coin, the alarm is stopped, and the arrest of the crank is raised. At the same time, as the keys are depressed, the receipt and sales-amount is automatically indicated, and by the turning of the crank the indicator device is returned, whereby the ejected coins are fed into a funnel and separated corresponding to their values and escape simultaneously from the machine. For the money received, a device is provided which is in connection with the drive and conveys the money automatically intermittently into a cash drawer of the machine. In order to find out which frames containing coins are empty, a window is provided on a suitable spot. Besides a door is arranged in order to remove easily the coin-frames.

The object of the invention is represented on the drawings in embodiments serving as examples.

Figure 47:
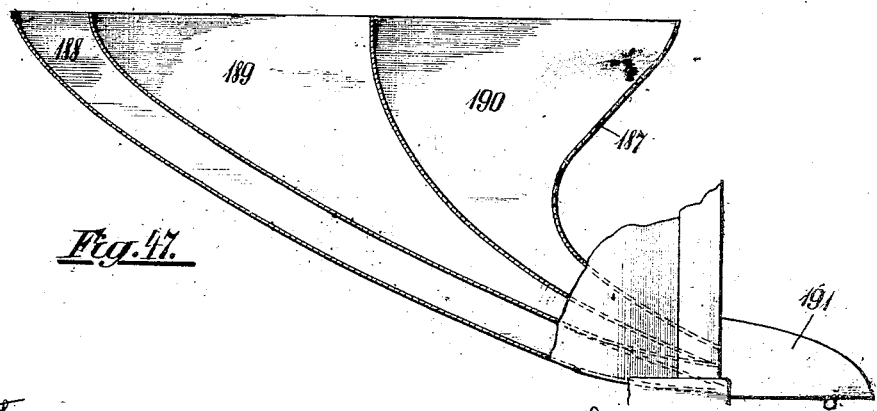
Figure 6:
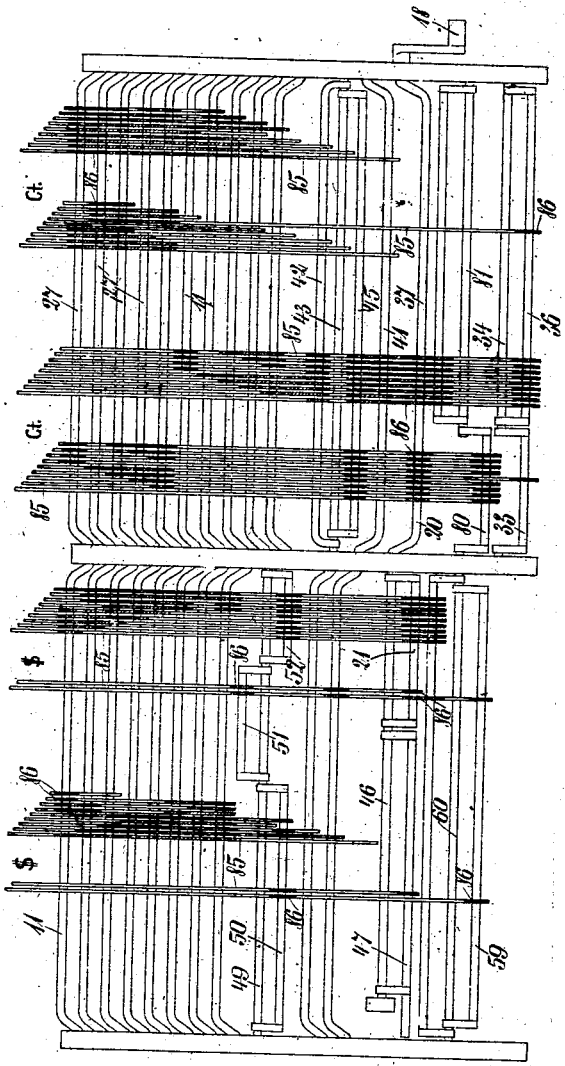
Figure 12:
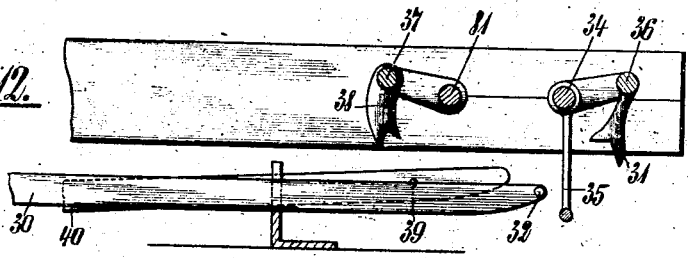
Figure 13:
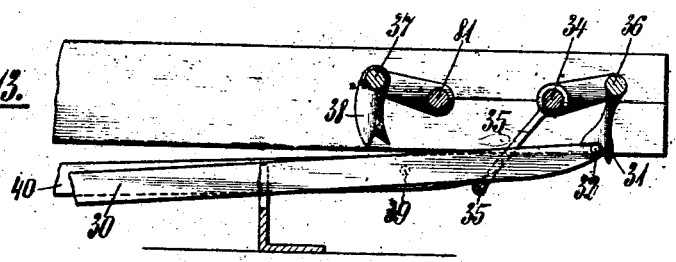
Figure 14:
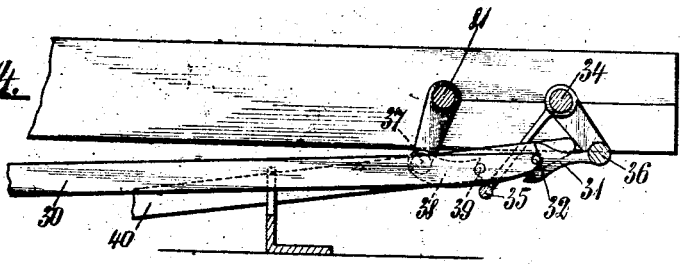
Figure 15:
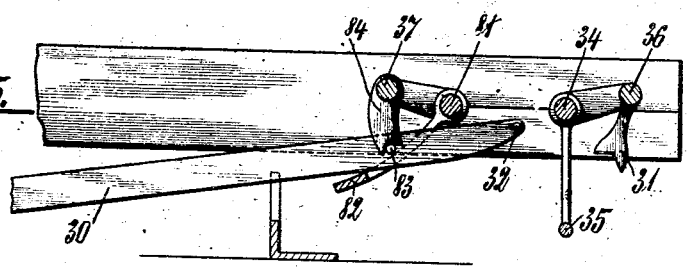
Figure 33:
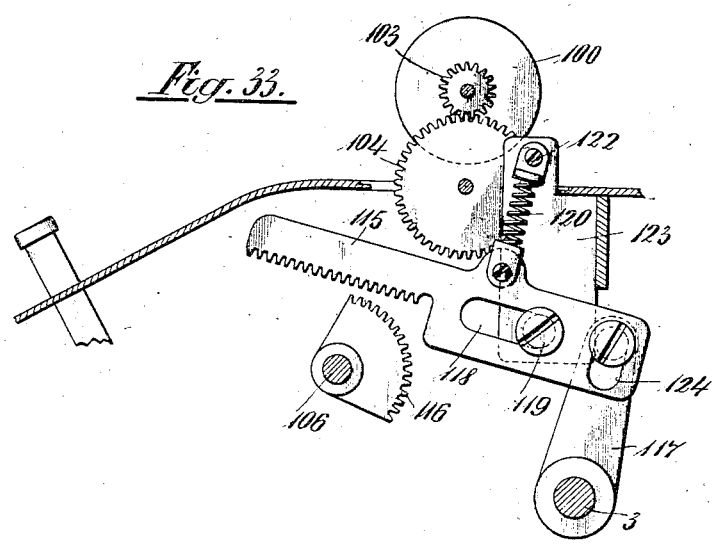
Figure 34:
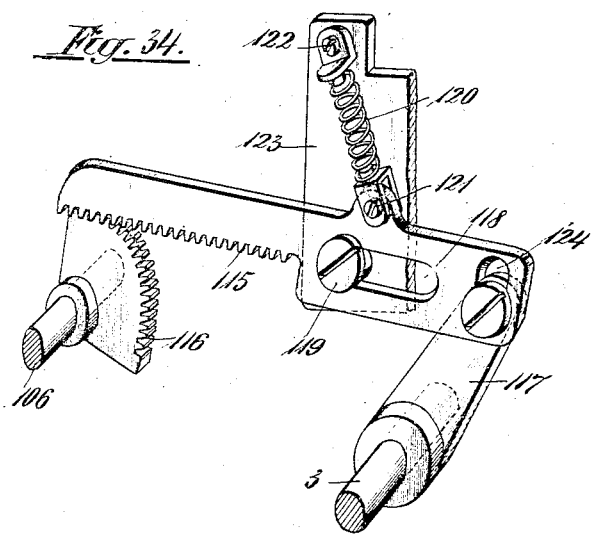
Figure 35:
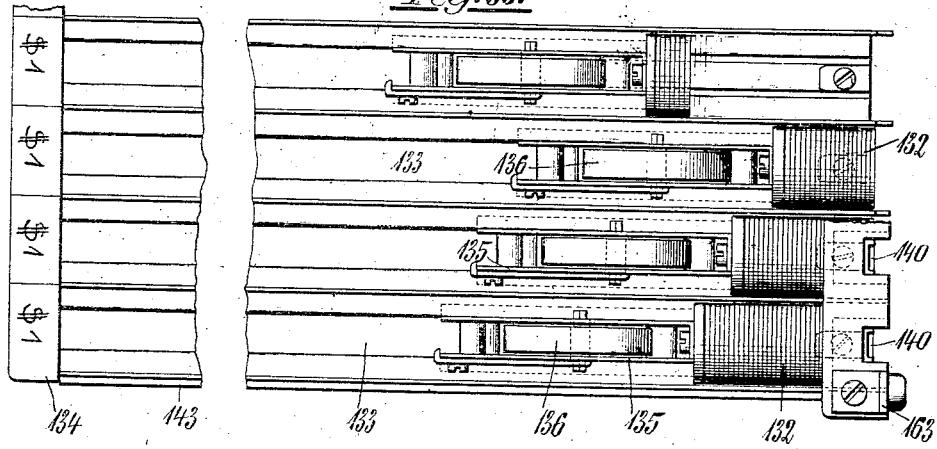
Figure 36:
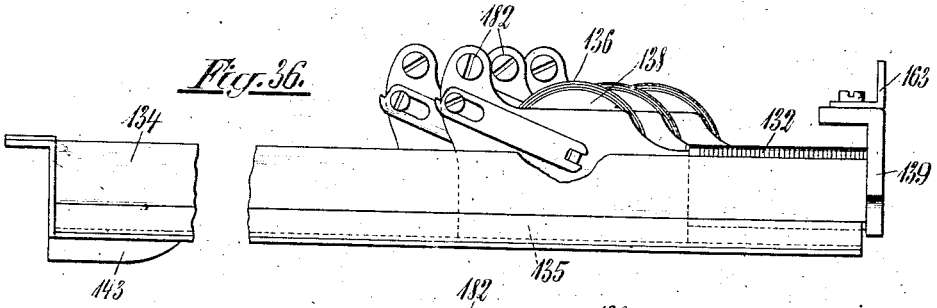
Figure 37:
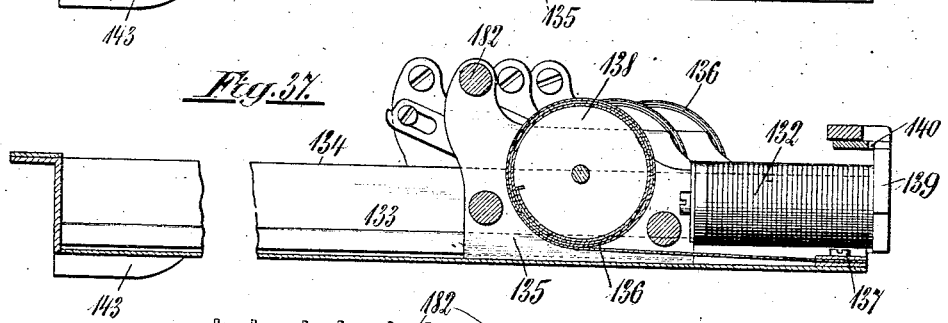
Figure 38:
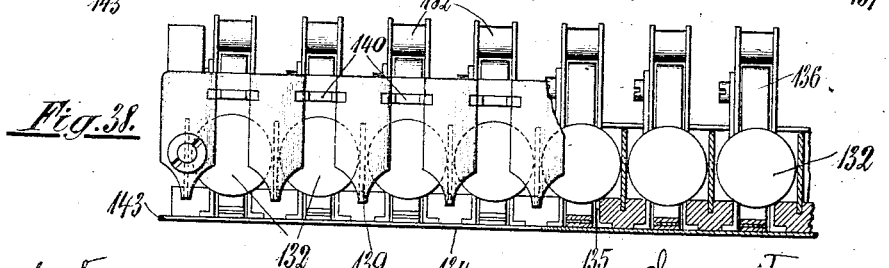
Figure 39:
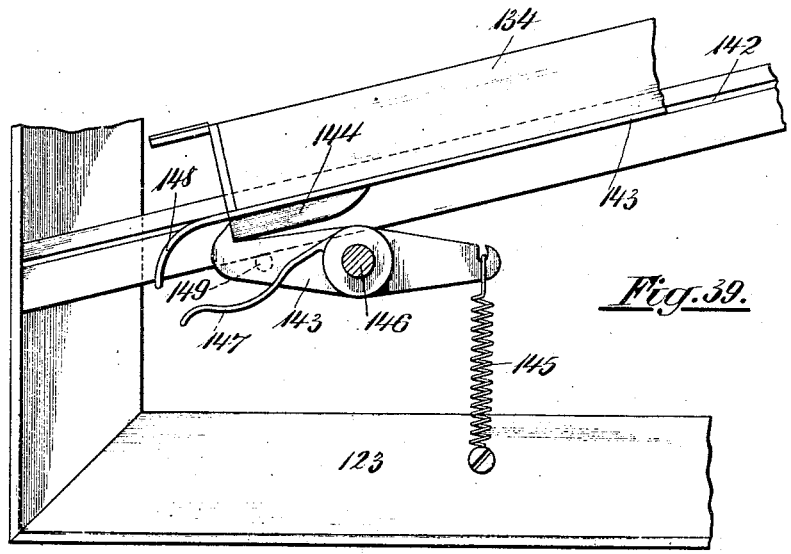
Figure 40:
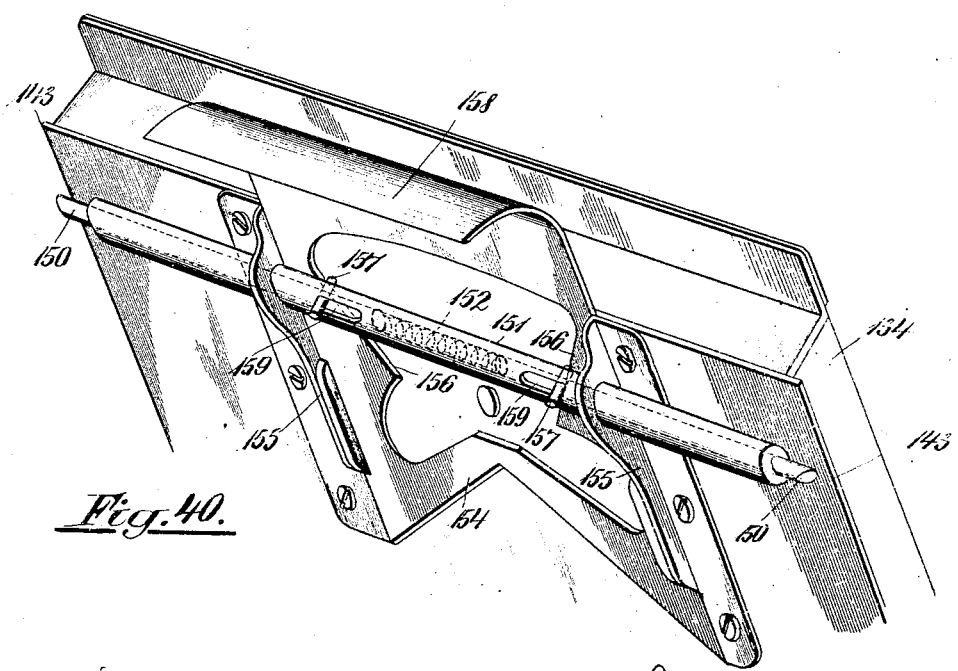

Figure 1 is a front view of the entire machine with partly broken off door; Fig. 2 is a rear view of the machine, while Figs. 3 and 4 represent side views with walls removed; Fig. 5 is a view seen from above of the working parts; Fig. 6 shows seen from above, the key rails and explains the action upon the rocking loops; Fig. 7 shows the arrangement of the keys; Figs. 8 to 10 show various positions of the loops with the double links in side view; while Fig. 11 represents the loop in sectional front view; Figs. 12 to 15 represent in various positions the operation of the working parts; Fig. 16 is a perspective drawing of the parts represented in Figs. 12 to 15; while Fig. 17 represents the loop divided in three parts, shown in Fig. 5 in perspective view; Fig. 18 is a perspective of the device for the actuation of the gold coin-group; Fig. 19 shows in partly sectional side view, the action or operation of the keys upon the rocking loops; Fig. 20 is a perspective of the group and coin-coupling; while Fig. 21 shows a section as seen from above; Figs. 22 and 23 represent in side view the coupling coupled or uncoupled; Figs. 24 and 25 show as a front section the device for the throwing out of gear of the ejector, if receipt of " dollar receipt " is equal to " dollar sale "; Fig. 26 is a side view on an enlarged scale of the arrest of the driving crank; Fig. 27 shows the adjustment of the registering wheels in side view; Figs. 28 and 29 are perspectives of the working parts of the adjustments; while Fig. 30 represents the steplike arrangement of the ends of the key-rails; Fig. 31 is a view of the registering wheels from the rear of the machine; while Fig. 32 is a section through Fig. 31; Fig. 33 shows in side view the returning of the operating parts of the registering device; Fig. 34 represents a perspective of another position of Fig. 33; Figs. 35 to 37 show as seen from above, as side view and sectional side view, the cash-drawers or boxes; Fig. 38 is the cash box drawn partly in section; Fig. 39 shows in side view the securing and attaching of a cash-box; Fig. 40 is a perspective of a modification of the above attaching; Figs. 41 and 42 show as seen from above and as side view, the alarm device; Fig. 43 is another position of the levers shown in Fig. 42; Figs. 44 to 46 are details of the alarm; Fig. 47 represents in front section the coin-collecting channel; Fig. 48 shows as seen from above, the drawer for the receipts; and Fig. 49 represents a sectional side view of the same.

The cash register and money-changer is provided in the customary manner with a set of keys (keyboard), which consists of the single sets of keys, 23 for the dollar receipts, 24 for the cents-receipts, and 26 for the penny-sales (Fig. 1). The keys have rails 85, the extensions of which 86 operate upon rocking loops 11 and 27 in the usual manner; the latter are held in the normal position by spring 87 (Figs. 4, 6 and 19). Corresponding to the coin value the key-rails 85 are provided with a number of greater or smaller adjoined pieces 86, so that these can operate upon more or less rocking loops as soon as a key is depressed. The rockers have also forks 88 with articulations 12 which throw couplings 8 into or out of gear, in order to couple the coin-ejector 1 with the driving shaft 3, so that the coin-ejectors start and eject the coins belonging thereto.

According to the present invention, the ejectors 1 are only loosely mounted on the boxes of the driving shaft 3 and divided in a number of groups, preferably and best in four groups, namely one for gold, one for silver dollars (marks), one for quarters (½ mark) and 10 cent pieces (10 pfennig), one for five cent pieces (5 pfennigs) and copper cents (pfennig), Fig. 5. The ejector 1 of the gold group is loosely mounted upon a box 2, the ejector of the mark or dollar group mounts box 89, those of the group for quarters and dimes mount a box 90 and the ejector for the copper is on a box 91 (Fig. 5). For each one of these four groups a separate coupling 4, 5, 6 and 7 is provided, the object of which is to couple the appurtenant box 2, 89, 90, 91, with the driving shaft 3. The couplings 4 to 7 are similar and, consequently, the gold coupling only is described here in detail. The same comprises essentially a coupling roll 4 (Figs. 6, 20, 23) which is connected by a link 48 with a rocking loop 47 which turns around a shaft 46, so that on depressing the 20 mark receipt-key the loop 47 rocks and advances therewith the links 48 with coupling roll 4. Thereby the roll 4 glides into a slot 10 of a lever 16, firmly connected with box 2, and at the same time into slot 14 of a lever 13 solidly mounted upon driving shaft 3, so that on turning the shaft 3 the lever 13 is likewise moved (Fig. 22) and if the roll 4 is advanced, that is, when coupling takes place, the lever 16 is also moved, whereby box 21 of the gold group is also turned around (Fig. 23).

For every coin-ejector the same adjustment is provided, which couplings are when the machine stops in engaging position. The same consists of the coupling roll 8, of a lever with a slot 9, mounted loosely on box 2, and a slotted lever 92 which is firmly united with box 2. (Fig. 21.)

The operation of the couplings is in short the following: After the key is depressed, the roll 4 advances and when by means of hand crank 17 the shaft 3 is turned, whereby the lever 13 is moved onward, which raises roll 4 with lever 16, as soon as the coupling has taken place, and as 16 is fixed on box 2, the latter, and with it lever 92, is turned. As now clutch 8 is in engaging position the lever 92 moves lever 9 also and the latter advances then the ejector 1. In order that now on turning back the shaft 3 the lever 16 and 9 return into their original position, the levers 13 are provided with a curve 15, shoulder, knob, etc., which engage, when returning, the levers 16 and 9 and move them back into place (Figs. 20, 21).

The driving crank 17 for the shaft 3 has a catch in order that the crank 17 cannot be turned around at will. This catch consists essentially of a knob 18, which is placed in the reach of a stop 19 of crank 17, so that the latter cannot be twisted (Figs. 5, 16, 21). The stop 19 is in this present case disk like, to which the rods 94 are secured, which by suitable intermediate links 95 are connected with the driving shaft 3 (Fig. 26). In order to release the disk 19 the knob 18 has loops 20 and 21 upon which strike all the sales-keys 24 and 26, and hereby rock the knob 18 in such manner that it releases stop 19 and then cranking can start. If, for instance, the driving shaft 3 is started to rock the levers 13 solidly mounted on shaft 3 are raised, but as no keys are depressed, hence none of the group-clutches 4 to 7 is coupled, the raising of levers 13 has no influence upon the ejectors. One or more or all groups of clutches 4, 5, 6 and 7 can be coupled at the same time and by the depression of a number of keys, the ejector clutches 8 are released so that on cranking only those ejectors 1 operate the appurtenant group-clutches of which 4 to 7 are first engaged and then second the ejector-clutch 8 is coupled.

As mentioned further above, the deduction from a previously registered amount with subsequent transition to a subordinate coin, as from dollars to cents or tens to ones, is attended to automatically and for this object the following described devices are provided. Most of the clutches 8 of the coin-ejectors 1 are connected by links 12 and forks 88 with the rocking loops 11, while the rockers 27 for the 10 and 50¢ ejectors are provided with elastic forks 28, which have links 29 and 30 on both sides, the links 29 being releasably connected with the ejectors 1, while the links 30, 40 can be connected with claws 31, 38 and 84 (Figs. 5 and 16). The elastic fork turns around a pivot 78, which is lodged in tubelike loop 27 and the fork 28 after it has been depressed by a key can be brought back nevertheless into its original position by depressing another key by means of spring 79 (Figs. 8–11).

The object of the elastic fork 28 with the two links 29 and 30, as well as claws 31 is the following: If, for instance, 50¢ are received and the amount to be paid also is 50¢, first the 50¢ key is depressed, which moves one of the loops 27, namely that which releases the previously engaged 50¢ clutch 8 (Figs. 5–6). Now the 50¢ sales-key is pushed in and this latter strikes with its adjoined pieces, besides other parts, the loops 27 of the "tens" clutches, whereby the at the start engaged "tens" clutches 8 are released. Simultaneously the loop 45 is also rocked which by a fork 97 and a link 98 clutches the clutch 7 of the coin-group tens and fifty. As the 50¢ sales-key strikes as all other sales-keys the loop 20 and the latter releases crank 17, the box 90 engaged by clutch 7 of the coin-group concerned, it is true, is twisted after the crank is turned, but this turn has no influence upon the ejectors, as the clutches 8 of the "4 tens" and of the "50" are released, as has been specified further above.

In Fig. 16, the adjoined pieces of the key-rails, which actuate the rocking loops are to be recognized by a black line. But if the receipt amounts to one dollar (mark) and the sale is 55¢ (d) the following takes place: On depressing of the $1.00 receipt-key the dollar-group is uncoupled. As soon as the 50 sales-key is depressed a release of the 4 ten clutches takes place. At the same time, the loop 33 is rocked around its axis 35, whereby the loop moves a frame 34 in such manner that it raises the links 30 of the released "tens" clutches and brings the same into the reach of fingers 31. The ends of the links 30 have for this object pivots 32, and lie in raised position before the claws or fingers 31 (Figs. 5 and 16). Now all the "ones" sale-keys bear down the two loops 36 and 37, so that on depressing of the "5 cents" sale-keys these loops are turned, whereby then the loop 36 with its claws 31 engages the pivots 32 in the rear and advances the links 30, that is, the 4 ten clutches are re-engaged, while the loop 37 by means of a finger 38 and a pin 39 draws back link 40, that is, the "50" clutch is released, so that now 4 tens are ready for ejection. But presently on depressing the "5 cents" sale key a loop 41 is actuated, upon which bear down all "penny" sale-keys, whereby loop 41 throws into gear the clutch 6 of the "5 cents" group and four of the one-group. Besides the "5 cents" sale-keys bear down in customary manner loop 11, so that the same "5 cents keys" throw out of gear the 4 "ones"-cents, which leaves still clutched the "5 cents" ejectors. On turning the crank there are ejected accordingly of the one sort of coins 4 "tens" and from the other series one "five cents", hence all told 45 cents. Then a loop 42 is provided which is solidly mounted on a shaft 43 of a loop 44, and is used that by depressing of a "penny" sale-key a "dollar" ejector 1 is released. On the same shaft 43 a loop 45 is loosely mounted, being employed to clutch the coin-series 4 tens and 50 cents.

As mentioned further above two other coin-series or groups are arranged, namely one for gold and one for silver-units (dollars, marks in the specification). In order to let them work in the correct manner, there are provided for them as for the other coin-series separate and similar devices as well as loops. For instance, loosely mounted on shaft 46 a loop 47 is provided which engages by means of link 48 the clutch 4 of the gold group. Further there are mounted partly loosely and partly solidly upon a shaft 49 three loops 50, 51 and 52, forming, so to say, a shaft divided in three parts and are used for the following purposes: The loop 50 is mounted loosely upon shaft 49 and the same is connected with a link 53, which couples the dollar-group. For this purpose there is immovably mounted on shaft 49 a thumb 54 which is under tension of a spring 55 and rests upon loop 50. Furthermore, the link 53 is connected through a fork 56 with shaft 49, which is depressed on rocking the loop 50 by means of spring 55 the thumb 54, whereby the shaft 49 revolves and advances hereby the link 53, that is, the clutch 5 for the dollar-group is coupled. Further, a loop 51 loosely mounts shaft 49 on which likewise rests a thumb 57 the spring 58 of which, however, is so strong that it overcomes spring 55, when the loop 51 is rocked, whereby the thumb 57 sinks and thereby rotates shaft 49, that is, the just before coupled coin group is again uncoupled. The third loop 52 which is immovably secured to shaft 49 rocks on oscillating the loop 52 the shaft 49 once more, whereby the dollar-group is reëngaged. In order to elucidate fully these features the following examples might be cited.

*Receipts $20.00, sales $10.00.*—As soon as the $20.00 receipt-key is depressed, the clutch of the gold coin-group is coupled through loop 47. At the same time, however, by the same key the loop 50 is rocked which throws the silver dollar group into gear. If now the $10 key is pushed the latter moves the loop 51, which then, as specified further above, disengages the clutch 5 of the "dollar pieces" group, so that on cranking by hand the crank ten dollars in coin are ejected. A similar device as in the four "tens" is also provided for the gold-ejector. This device consists of a loop 59 which is solidly mounted upon a shaft 60 and raises on rocking a frame 61. The latter raises a link 62 which is connected with the link 63 and as link 62 bears a pivot 64 the latter comes within the reach of claw 65, which is mounted on a loop 66. If now the latter loosely mounted on shaft 60 is pushed then it namely 66, draws back by means of its claw 65 the links 62 and 63, that is, the $10 ejector is disengaged.

*Receipts $20, sales $15.*—The $20 receipt key is pressed and the two loops 47 and 50 rock, so that the coin group clutches 4 and 5 for gold and silver dollars are coupled. If now the $10 sale key is pushed, the latter rocks loop 51, so hereby the silver dollar group is disengaged by clutch 5, so that now still ten dollars gold coin are ready for ejection. But the $10 sale-key pushes at the same time the loop 59 and the latter raises with its frame 61 the link 62. All the one-dollar sale-keys push the loops 52 and 66. As soon as now the $5.00 sale-key is pushed the loop 52 reëngages the one silver-dollar-group and the loop 66 draws back the clutch 4 of the gold-coin-group. Besides the $5 sale-key with its adjoined pieces, however, pushes in known manner the loops 11 and removes them from the coupled silver-dollar-group $5.00, so that through this turning of the crank $5.00 are ejected.

*Receipts one dollar, sales 65¢.*—If, for instance, 65¢ is the amount of the sale, the 60¢ sale-key pushes, as all "tens" sale-keys with the exception of the 50¢ sale-key, a loop 80 which turns the shaft 81, whereby the latter raises a frame 82, namely in such manner, that its pin 83 is engaged in the rear by a finger 84. If now the 5¢ sale-key is pushed the same rocks loop 37, so that only the one "tenner" is disengaged by finger 84, and only three "tens" are ready for ejection. But at the same time the 5¢ sale-key has uncoupled from the appurtenant change-group the four "one cents" so that, if the receipts are one dollar and the sales amount to 65¢, 35¢ are going to be ejected.

As soon as the dollar-receipts are equal to the dollar-sale, the one dollar ejector always adjusted in order to oblige the machine to operate correctly must be uncoupled (Figs. 24–25). For this purpose the receipt-keys 23 and the sales-key 24 are connected together releasably through a gear 67 and 68 the one of which 67 rotates in a bearing 69 around a pivot 70 and bears a pressure roll 71, while the other one 68 has a slot 72 into which enters a pin 73 of the bearing 69 and serves as a guide. The key-rods 23, 24 are provided with slots 74, whereby the one gear 67 always can rest in the slot 74, while the other gear 68, only when depression of receipt-keys 23 is effected is inserted (shoved in) by means of pushing roll 71 and of the inclination 75 of the gear 68 into the slot 74 of the sale-key 24. On depressing sale-key 24 the gear 68 is moved on and the same pushes a rail 76 under tension of a spring which then rocks the loop 44 of the one silver dollar ejector and uncouples the appurtenant clutch. The gears 67 and 68 are then subjected to the tension of a spring 77. In order to now indicate the amount of receipts as well as sales, a registering device is provided which on depressing of the keys work automatically. The registering device consists essentially of figure-wheels, namely of wheels 99 which are visible to the buyer and indicate the amount of the sale and of wheels 100, which show the cashier both the amount received and the amount of the sale and are marked, for clearer distinction between the two, dissimilarly (Fig. 31). The figure wheels 99 and 100 are mounted partly loosely upon a shaft 101, partly solidly upon sleeves 102 which likewise loosely turn around shaft 101 in certain cases two each of the figure wheels are connected together. This is required in order to be able to show the buyer as well as also the salesman the amount sold (Fig. 32). The wheels 99 and 100 are in connection with a toothed segment 105, which is loosely arranged on a shaft 106 and the weighted lever arm 107 of which attempts to rock the segment 105 upon the shaft 106. In order to hold the segment 105 in its normal position, the same is connected with a segment 108, which is held by a latch 109, the latter put under tension by a spring 110. On depressing of a key the segment 108 is then released in such manner that the key-rail 85 provided with a hooklike end 111 carries off a frame 112 to which is secured the latch 109. Hereby the latch 109 turns now around its pivot 113 and releases thereby the forward end of latch 109 of the segment 118, so that by this time by reason of the weight 107 the toothed segment 105 rocks and hereby by the aid of cogwheels 103 and 104 rotates the appurtenant wheel 99 or 100.

The described device is provided eightfold, namely four times for the receipt-keys and four times for the sale-keys, to wit: dollars, "ones and tens"; cents, "ones and tens."

In order to twist the figure-wheels 99 and 100 corresponding to the value of the figure to be indicated, the ends 114 of the key-rails 85 are arranged in steps and operate with the part 107 of segments 105 and 108 in such manner that member 107, if rocking, strikes upon the end 114 of the depressed key-rail 85, and corresponding to the distance passed over twists the figure wheel 99 or 100 more or less. Further there is also provided an arrangement which returns the adjusted wheels 99 or 100 into the original position, that is, into the zero position. For this purpose, the ejector-shaft 3 is connected with a rack 115, which intermittently meshes with a toothed segment 116 solidly mounted on shaft 106, this segment being then twisted by the engagement. The arrangement operates as follows: In a position of rest all the parts are in the position represented in Fig. 33 and after the desired keys are depressed, whereby, as mentioned above, the segments 105 and 108 rotate, the crank is turned, whereby the ejector shaft 3 rocks moving thereby a lever 117. The latter draws now back the rack 115 provided for this purpose with a slot 118 and coöperating with a pivot 119. Besides the rack 115 is always drawn upward by a spring 120 the one end of which 121 is secured to the rack and the other one 122 is revolubly attached on the machine frame 123. On turning the shaft 3, as well as on shifting the rack 115 the same is thrown out of gear with the segment 116, so long as the fastening 121 of the spring 120 lies before the pivot 119, as soon as pivot 119 is passed the spring 120 pulls on the end of the rack 115 which is provided with the slot 124, whereby the rack 115 is meshing with segment 115. As by reason of gear 94 and elbow lever 95 the shaft 3 rocks, that is, makes a movement to and fro there is by this time returned through the turning back of the shaft 3 the rack 115, whereby the latter twists segment 116 and likewise shaft 106 (Figs. 33 and 34). Upon this latter are solidly mounted a number of levers 125, having bolts 126, the levers being raised on the twisting of the shaft 106, whereby the bolts 126 meet the segments 105 and 108 and carry them along until they have reached their normal position, and are held again by latches 109 (Fig. 28). In this connection the pivot 121 of spring 121 is again moved into such position, as is shown in Fig. 33, and the rack 115 is thereby drawn upward, through which the segment 116 and the levers 125 by the aid of spring 127 which moves lever 128 are returned into the original position and in order to limit the movement a lever 129 is arranged on shaft 106, the head 130 of said lever 129 striking a stop on machine frame 123.

In the case that a wrong key has been pushed the returning of the segments 105 and 108 as well as of the wheels 99 and 100 must take place without that the crank 17 need be turned. For this purpose a hand lever 131 is provided on the outside of the machine which is solidly secured on shaft 106, which latter can be turned by the rocking of this outside lever 131, whereby the same operations are performed, as if the segment was twisted by means of rack 115 (Fig. 28).

In order to always feed the coin ejectors 1 coins 132 the same are stapled in slots 133 of a box 134 and are always advanced by a carriage 135 which is driven by the tension of a spring 136. The one end of the spring 136 is secured by means of a screw to the box 134, while the spring 136 itself is wound on a roll 138. The foremost coin lies on a stop or blade 139 and is ejected by ejector 1, which is moving in guides 140 when the shaft 3 is rocked (Figs. 35–38). The boxes 134 glide with their projecting ends 141 of the bottoms in solid guides 142 of the machine frame and are held by special devices (Figs. 1, 39 and 40). One of these devices consists of a latchlike lever 143 engaging the stop 144 of the box 134 in the rear and is drawn tight by a spring 145. The lever 143 is mounted on the shaft 146 on which a trigger 147 is adjusted which on being depressed twists the shaft 146, whereby the latch 143 releases stop 144, so that now by the aid of handle 148 the box 134 can be taken out. Preferably, the stop 144 is tapered on its rear end in order that on putting the box back the latch 143 is depressed. In order to limit the movement of lever 143, the same is provided with a pin 149 which strikes guides 142.

Fig. 40 represents a modification. Here two bolts 150 are movably borne in a pipe-like part 151 and are subjected to the tension of a spring 152, which presses the two bolts 151 always outward. On putting in the box 134, the tapered ends of the bolts 150 strike the stops 153 on the machine frame 123 whereby the stops 153 push back the bolts 150 until in their further advance the bolts engage the stops 153 in the rear (Fig. 1). In order to be able to remove the box 134 for instance for filling it with coin, it is required, to draw back the bolts in order that they can slide around stops 154. For this purpose, a slide 154 is provided which glides in guides 155, and has tapered ends 156 with which the guides 155 engage the pins 157 of bolts 150 in the rear, so that on advancing of the slide 154 by means of handle 153, the taperings 156 shove the pins 157 inward, whereby the bolts 150 are then drawn back. The pipe-like part 151 has slots 159 serving as guides in the above case.

On introducing a coin-box 134 a clockwork for an alarm is wound up at the same time, which has the object to ring as soon as one of the coin staples is exhausted. For this object a lever 161 is mounted loosely a shaft 160, the end of 161 bearing a roll 162 which meets a shoulder (finger) 164 of box 134 and moves the latter. Then there is revolubly arranged on the lever 161, a latch 164 which is pushed by a spring 165 against a toothed segment 166 solidly mounted on shaft 160 (Fig. 43). As soon as now the lever 161 is carried off by finger 164 the latch 163 shifts the segment 166 and twists therewith the shaft 160, and as the toothed segment 167 is connected by a cog wheel 168 with a clockwork 169, the latter is wound up (Fig. 42). At the same time the end 170 of the latch 164 slides upon a bolt 171 which causes the latch to let go the segment 166. The clapper 172 of the alarm bell cannot start however, as the same (172) is held by an arm 173. The latter is mounted on a shaft 174 which is borne in bearings 175 on the clockwork frame 176 and has a lever 177 the one end of which is connected with a spring 178, with the object, to arrest the clapper 172, while the other end is connected with a drawing part 179 which is connected with a double armed lever 180 solidly mounted on a shaft 181. The one end of the lever 180 projects into the path of a stop 182 of the carriage 135 (Fig. 3). As soon as now a coin box is exhausted, the stop 182 of the carriage 135 meets the lever 180 whereby the latter rocks and pulls on the drawing part 179, the arm 173 thereby releasing the clapper 172 (Fig. 46 in dotted lines) and then the alarm rings. The clockwork 169 is run down by this, whereby the segments 166 and 167 are again returned, while the lever 161 remains in its position. But as soon as the coin box 134 is pulled out the lever 161 goes back influenced by the spring 206 until it meets a stop 207 of the segment 166. If now stacking of coin does not take place for any reason whatever, precaution is taken which does not permit a cranking of the hand crank 17, that is, the latter is stopped (Fig. 3). In order to render this possible, the levers 180 and another lever 183, which latter rocks simultaneously with 180 on rocking one of the levers 180, are mounted on shaft 181. Hereby a double lever 184 is moved with which 183 is connected by a gear 185 in such manner that the lever 184 moves with its upper arm under a fixed stop 186 of the crank disk 93, and prevents thereby a turning of the crank 17. But as soon as the box 134 is taken out, the stop 182 releases the lever 180, so that the same goes back into its original position whereby the lever 184 releases the stop 186.

The ejected coins fall into a funnel 187 (Fig. 47) which is divided into several channels 188, 189 and 190, with the object, to receive the coins arranged according to their value on a plate 191, so that at a glance it can be seen if the correct sum has been paid out. Preferably three channels are provided, namely one channel 188 for gold, a channel 189 for silver dollars and a third channel 190 for fractional currency including from 50¢ downward, nickel and copper money.

The received amount is laid into a compartment 192 of a revolving frame 193, which rotates over a fixed bottom 194, and thereby removes the coins from the bottom. At one place the bottom 194 has an opening through which the money goes into a receptacle 196 which can be locked. The carrying of the money, that is, the rotation of the frame 139 is automatic in the following manner. The angular lever 95 moved by the gear 94 of the crank disk 93; said lever 95 moving the ejector shaft 3 is connected with a gear 197 with a lever 198 which rocks a shaft 199 which bears a lever 200 and likewise rocks. This lever 200 is forked on its lower end and grasps a bolt 201 of a lever 202 which rotates around a pivot 203 and bears a pawl 204 engaging a ratchet 205 of the frame 193, so that on cranking by means of crank 17 the shaft 199 rocks and advances pawl 204, that is, turns the frame but only so much as the size of the compartment measures or amounts to. The machine is completely closed in and provided at a suitable spot with a door 22 with any kind of a lock 96.

Having thus particularly described my invention, what I claim as new and desire to secure by Letters Patent, is:—

1. A multiple coin deliverer, comprising ejectors, an ejector operating crank, receipts and sales key-bars for coupling the ejectors, means operated by the receipts key bars for adjusting the sales key bars, whereby the sales key bars are set by the operation of the receipts key bars, means for indicating when the coins are exhausted, and means for preventing the movement of the ejector-operating crank when said coins are exhausted.

2. A multiple coin-delivering apparatus, comprising key bars, coin ejectors, couplings, and a controlling member, said key bars being with means constructed to engage the couplings for the coin ejectors and also the controlling member, whereby a succeeding key under pressure engages not only the coupling member of the coin ejector but also the controlling means, the latter actuating a further ejecting coupling, so that with one key several amounts are adjusted with respect to the preceding key adjustments, and means for indicating when the coins are exhausted.

3. A multiple coin-delivering apparatus, comprising key bars, coin ejectors, couplings, and a controlling member, said key bars being constructed to engage the couplings for the coin ejectors and the controlling member, whereby a succeeding key when operated engages not only the coupling member of the coin ejector but also the controlling means, the latter actuating a further ejecting coupling, so that with one key several amounts are adjusted with respect to the preceding key adjustments, means for indicating when the coins are exhausted, and means for preventing the operation of the ejector-operating crank.

4. In a device of the character described having receipt and sales key bars, coin tubes, and an ejector mechanism with a crank for operating the same, and levers operated by the key bars for setting the proper ejectors, means operable by the emptying of a coin tube to prevent the operation of the ejector-operating crank and preventing the movement of the key bars.

5. In a device of the character described having receipt and sales key-bars, coin tubes, an ejector mechanism with a crank for operating the same, levers operated by the key bars for setting the proper ejectors, means operable by the emptying of a coin tube to prevent the operation of the ejector-operating crank and preventing the movement of the keys, and a shaft adapted to operate a signal device with connections between the signal shaft and the ejector-operating means for preventing movement of the latter when the signal shaft is operated.

6. In a device of the character described having receipt and sales key-bars, coin tubes, an ejector mechanism with a crank for operating the same, levers operated by the key bars for setting the proper ejectors, means operable by the emptying of a coin tube to prevent the operation of the ejector-operating crank and preventing the movement of the keys, a shaft adapted to operate a signal device with connections between the signal shaft and the ejector-operating means for preventing movement of the latter when the signal shaft is operated, said ejectors having a loose spring connection with their operating mechanism.

In testimony whereof I affix my signature, in presence of two witnesses.

KARL MAIER.

Witnesses:
  Johann Schlins,
  August Fugger.